United States Patent
Wang-Lee

[11] Patent Number: 6,086,200
[45] Date of Patent: Jul. 11, 2000

[54] EYEGLASSES TEMPLE ANGLE ADJUSTING DEVICE

[76] Inventor: Tzu-Feng Wang-Lee, 40, Lane 30, Lung Chung Street, Yungkang, Tainan County, Taiwan

[21] Appl. No.: 09/347,681

[22] Filed: Jul. 2, 1999

[51] Int. Cl.[7] .................................................. G02C 5/14
[52] U.S. Cl. ........................................ 351/120; 351/111
[58] Field of Search .................................. 351/111, 120, 351/41, 118, 119

[56] References Cited

U.S. PATENT DOCUMENTS

| | | | |
|---|---|---|---|
| 5,760,867 | 6/1998 | Pernicka et al. | 351/120 |
| 5,890,235 | 4/1999 | Wiedner et al. | 2/431 |
| 5,980,038 | 11/1999 | Chen | 351/120 |

*Primary Examiner*—Hung Xuan Dang
*Attorney, Agent, or Firm*—Alan Kamrath; Oppenheimer Wolff & Donnelly LLP

[57] ABSTRACT

An eyeglasses temple angle adjusting device includes an angle adjusting member connected between an end of a frame and an inner end of a temple. The angle adjusting member is provided with two second vertical concave toothed sections and each end of the frame is provided with two ears formed divided by an intermediate opening. The two ears are provided with first two convex toothed sections to engage the second two concave toothed sections. The angle adjusting member further has an engage member at a side to fit in an engage hole formed in a wall defining the intermediate opening, and a front horizontal movable section to fit movably in the intermediate opening so that the angle adjusting member may be moved up and down by engagement of the first and the second toothed sections, permitting the temple to move up and down in its angle to the frame.

15 Claims, 3 Drawing Sheets

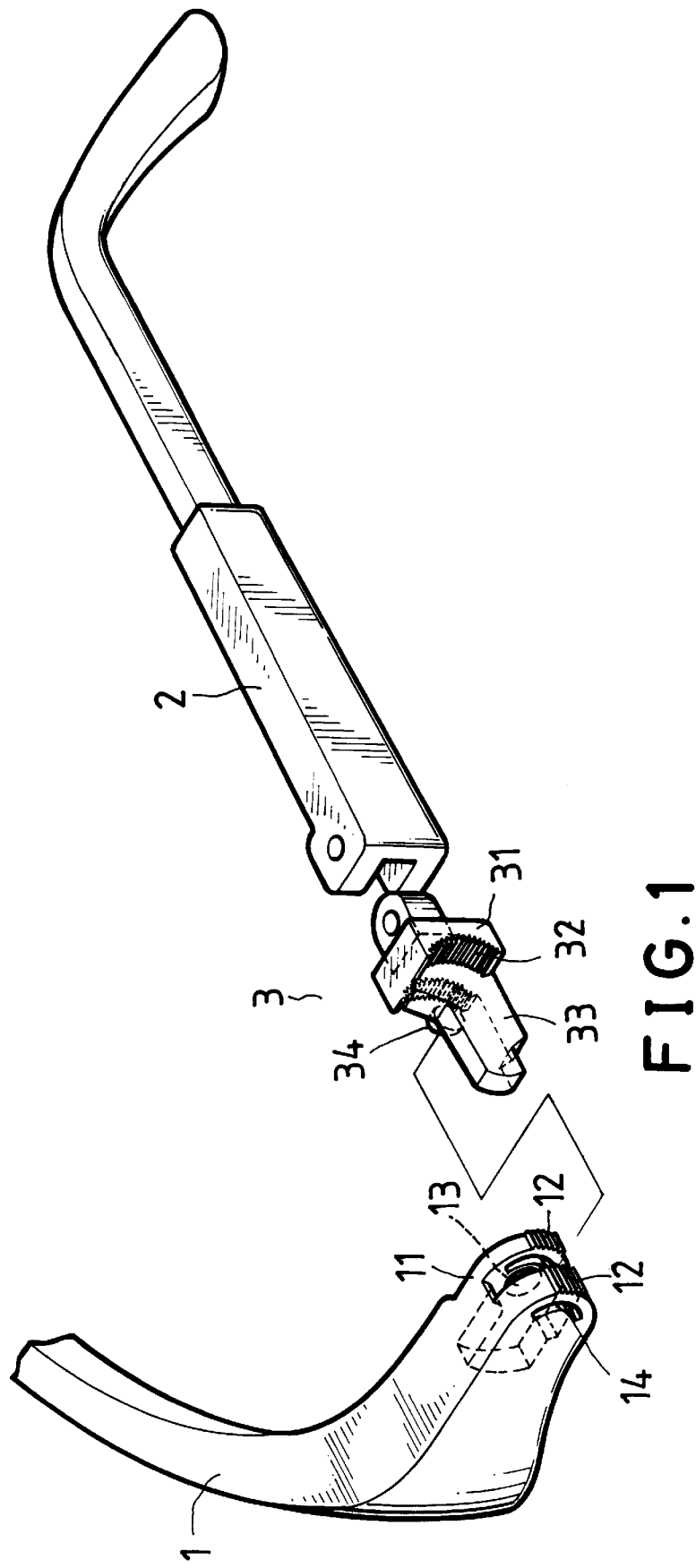

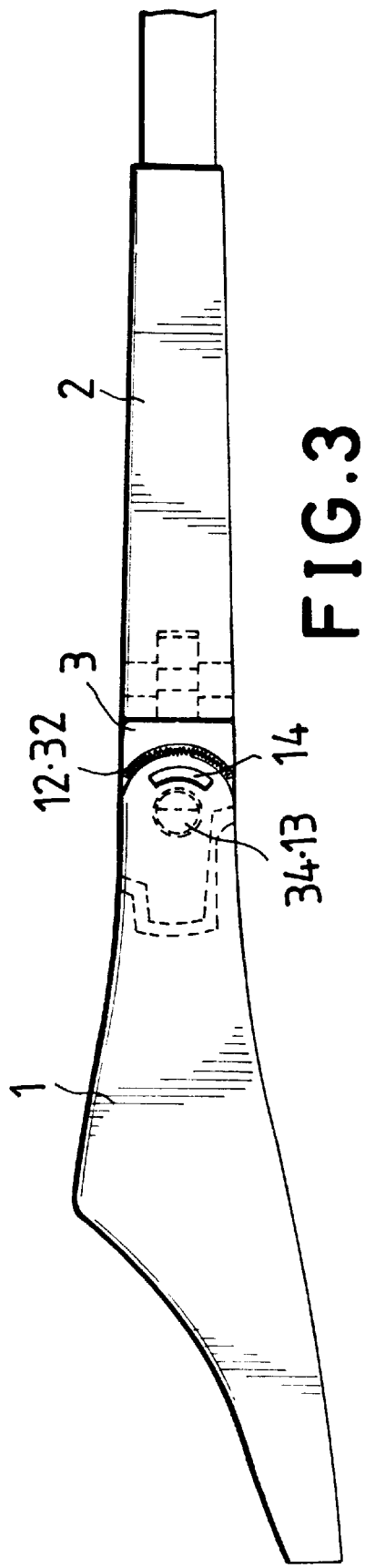
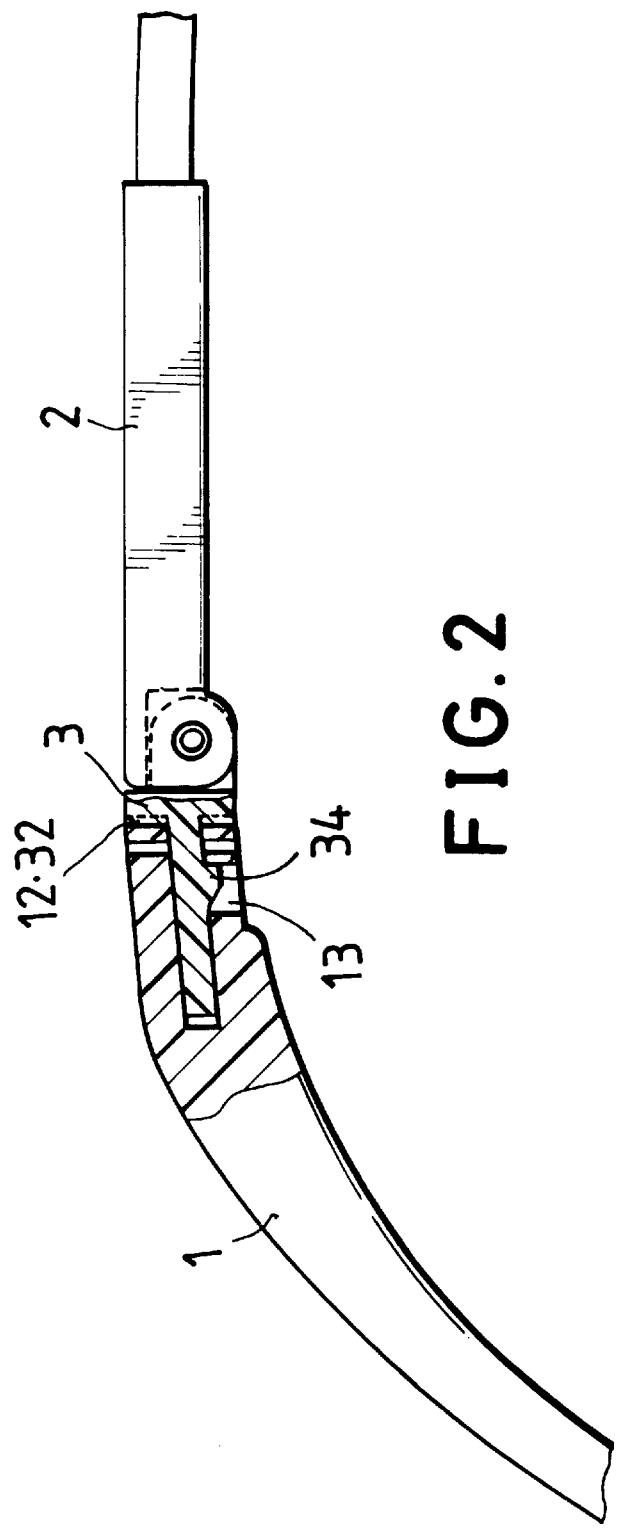

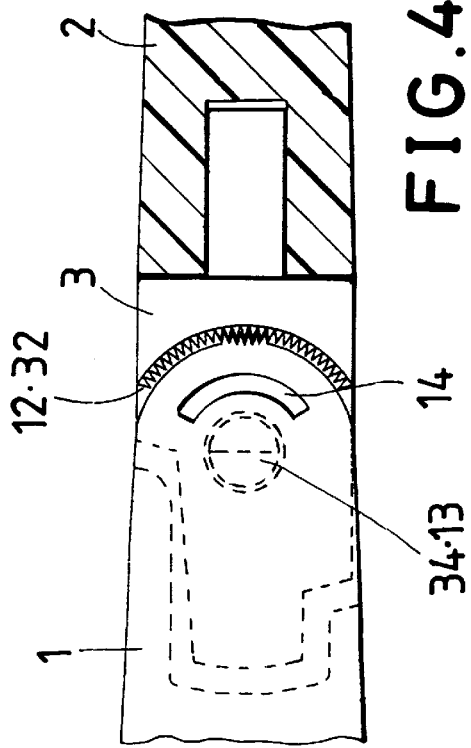
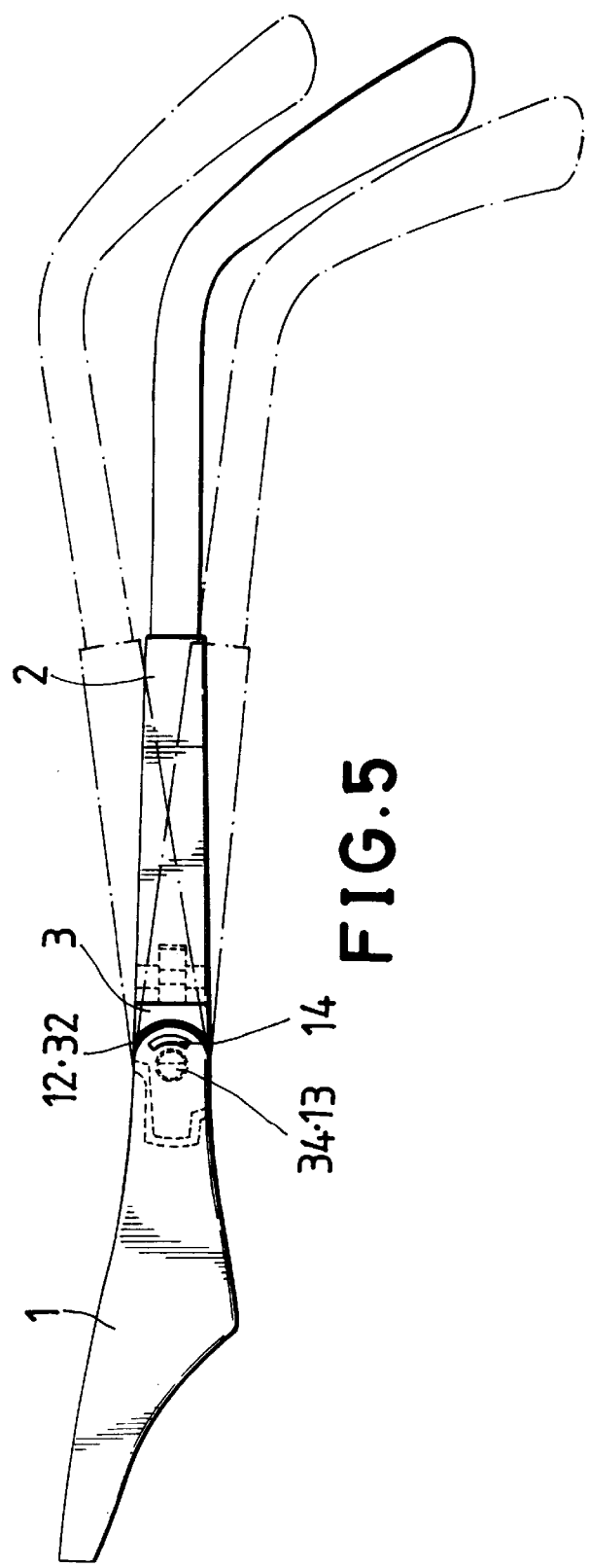

EYEGLASSES TEMPLE ANGLE ADJUSTING DEVICE

BACKGROUND OF THE INVENTION

This invention relates to an eyeglasses temple angle adjusting device, particularly to one chiefly used for industrial safe eyeglasses, easy to adjust the angle of the temple to the frame of eyeglasses by means of first two vertical convex toothed sections provided on two ears of a frame and second two vertical concave toothed sections provided on the angle adjusting member and engaging movable with the first two toothed sections.

A known conventional industrial safe eyeglasses disclosed in U.S. Pat. No. 5,898,235 includes a lens 1 shaped integral, frame 2 combined with the lens 1, a first connector 3, second connector 4 and a third connector 5, and a hinge 28.

The two ends of the frame 2 is respectively provided with a vertical groove having a plurality of teeth on its surface. The teeth engage the first connector 3.

The third connector 5 is connected to the upper end of the temple, having a center hole at one end, for the second connector 4 with a connecting portion 30 to extend in the center hole. Further, a hinge 28 is provided to be connected to the connecting portion 30, fitted with an ear at one end of the first connector 3 and combined with each other with a pin 29.

Further, the first connector 3 has a ratchet tooth 15 on an end surface to engage the teeth of the ends of the frame 1, permitting the temple to move up and down so that the angle between the temple and the frame may be adjusted by moving the temple up and down.

However, the conventional eyeglasses have disadvantages that the front end surface of the first connector 3 and the ratchet tooth 15 and the teeth on the bottom of the vertical groove of the frame 2 are of too small dimensions, and in addition, the teeth are provided in the bottom surface of the vertical groove, so they are very difficult to process. There are quite a few components needing molds, resulting in high cost to manufacture.

SUMMARY OF THE INVENTION

This invention has a main objective to offer an eyeglasses temple angle adjusting device, which includes two ears formed respectively in two ends of a frame and an angle adjusting member to be connected between the ear and an inner end of a temple. The ears each have a first vertical toothed section on a convex end surface and two second vertical concave toothed sections formed in a concave vertical surface of an intermediate extension of the angle adjusting member. Then the first toothed and the second toothed sections engage with each other movably so that the temple may be moved up and down in its angle to the frame after the temple is assembled with the frame.

BRIEF DESCRIPTION OF DRAWINGS

This invention will be better understood by referring to the accompanying drawings, wherein:

FIG. 1 is an exploded perspective view of an eyeglasses temple angle adjusting device in the present invention;

FIG. 2 is a cross-sectional view of the eyeglasses temple angle adjusting device connected between a temple and a frame in the present invention;

FIG. 3 is a side view of the eyeglasses temple angle adjusting device connected between a temple and a frame in the present invention;

FIG. 4 is a magnified view of the eyeglasses temple angle adjusting device in the present invention; and, FIG. 5 is a side view of the eyeglasses temple angle adjusting device being adjusted in its angle in the present invention.

DETAILED DESCRIPTION OF THE PREFERRED EMBODIMENT

A preferred embodiment of an eyeglasses temple angle adjusting device in the present invention, as shown in FIGS. 1, 2 and 3, includes a frame 1, a temple 2 and an angle adjusting member 3 connected between the end of the frame 1 and an inner end of the temple 2.

The frame 1 has two ears 11 formed divided with an intermediate opening respectively in two ends, a first vertical toothed section 12 respectively formed on a convex end surface of the two ears 11, an engage hole 13 formed in a wall defining the intermediate opening, and a curved slot 14 formed respectively in the two ears 11 near the convex end surface so as to permit some elasticity to the two ears 11.

The angle adjusting member 3 has an intermediate extension 31 with a front vertical concave surface, two second vertical toothed sections 32 formed divided in the front vertical concave surface and engaging with the first two toothed sections 12 of the two ears 11 of the frame 1, a front movable section 33, and an engage member 34 formed on a side of the intermediate portion opposite to the intermediate extension 31.

In assembling the angle adjusting member 3 with the frame 1 and the temple 2, firstly, the second two vertical toothed sections 32 are made to engage the second two toothed sections 12 of the two ears 11 of the frame 1, with the front movable section 33 fitting in the intermediate opening, and with the engage member 34 fitting in the engage hole 13 of one of the two ears 11, as shown in FIGS. 3 and 4. Then the angle adjusting member 3 is screwed with the inner end of the temple 2.

In use, as shown in FIG. 5, the temple 2 is moved up or down, moving the toothed sections 32 up or down relative to the toothed sections 12 of the two ears 11 of the frame 1 to a needed angle formed between the temple 2 and the frame 1 according to a user's face.

The eyeglasses angle adjusting device in the present invention has the following advantages, as can be understood from the aforesaid description.

1. It is easy to make by manufacturers by means of a simple mold, having the first and the second toothed sections easily processed on outer surfaces of the components, suitable for mass production.

2. It is easy to assemble or disassemble.

3. It is not only simple to adjust the angle, but smooth to operate, because of the large dimensions of the toothed sections of the angle adjusting member and the frame and close mutual engagement of the toothed sections.

While the preferred embodiment of the invention has been described above, it will be recognized and understood that various modifications may be made therein and the appended claims are intended to cover all such modifications which may fall within the spirit and scope of the invention.

What is claimed is:

1. An eyeglasses temple angle adjusting device comprising, in combination: an angle adjusting member and two ears formed respectively in an end of a frame and connected between the end of said frame and an inner end of a temple;

said two ears of said frame respectively having a first convex toothed section formed on a convex end surface, and an engage hole formed in a wall defining an intermediate opening dividing said two ears, and a curved slot formed respectively near the convex end surface of said two ears;

said angle adjusting member having an intermediate extension, two second concave vertical toothed sections formed separated in a front concave vertical side of side of said intermediate extension, a front horizontal engage section formed to extend forward from the intermediate extension, and an engage member formed on a side of the intermediate extension; and said two second concave toothed sections of said angle adjusting member engaging said first two convex toothed sections of said two ears of said frame after said angle adjusting member is assembled between said frame and said temple, said engage member of said angle adjusting member engaging said engage hole of said ears of said frame, said front engage section fitting movably in said intermediate opening of said two ears of said ears, said temple adjustable in its angle to said frame by lifting up or pushing down with said two second concave toothed sections movable up and down relative to said two first toothed sections of said ears of said frame, said first and said second toothed sections making it possible to keep tightness in mutual engagement to secure said temple with said frame after adjustment in its angle to said frame.

2. A device for adjusting the angle of a temple relative to a frame of eyeglasses comprising, in combination: an angle adjusting member, with the frame including two first toothed sections, with the angle adjusting member including two second toothed sections, with the angle adjusting member being securable with the temple, with the angle adjusting member being pivotally connected to the frame, with one of the toothed sections including a forward moveable section extending forwardly of and intermediate the two toothed sections and the other of the toothed sections including an intermediate opening extending rearwardly of and intermediate the two toothed sections, with the forward moveable section fitting in the intermediate opening and limiting the extent that the angle adjusting member can pivot relative to the frame.

3. The angle adjusting device of claim 2 wherein one of the toothed sections is concave and the other of the toothed sections is convex.

4. The angle adjusting device of claim 3 wherein the convex toothed sections include a curved slot formed near the convex toothed sections.

5. The angle adjusting device of claim 4 wherein one of the toothed sections is formed on two spaced ears, with one of the two spaced ears including an engage hole; and wherein the other of the toothed sections includes an integral engage member for fitting within the engage hole to pivotally connect the angle adjustment member to the frame.

6. The angle adjusting device of claim 5 wherein the convex toothed sections are included on the frame.

7. The angle adjusting device of claim 6 wherein the intermediate opening is included in the frame.

8. The angle adjusting device of claim 5 wherein the intermediate opening is included in the frame.

9. The angle adjusting device of claim 4 wherein the convex toothed sections are included on the frame.

10. The angle adjusting device of claim 9 wherein the intermediate opening is included in the frame.

11. The angle adjusting device of claim 3 wherein one of the toothed sections is formed on two spaced ears, with one of the two spaced ears including an engage hole; and wherein the other of the toothed sections includes an integral engage member for fitting within the engage hole to pivotally connect the angle adjustment member to the frame.

12. The angle adjusting device of claim 11 wherein the intermediate opening is included in the frame.

13. The angle adjusting device of claim 2 wherein one of the toothed sections is formed on two spaced ears, with one of the two spaced ears including an egg hole; and wherein the other of the toothed sections includes an integral engage member for fitting within the engage hole to pivotally connect the angle adjustment member to the frame.

14. The angle adjusting device of claim 13 wherein the intermediate opening is included in the frame.

15. The angle adjusting device of claim 2 wherein the intermediate opening is included in the frame.

* * * * *